United States Patent
Heimberger et al.

(10) Patent No.: US 9,656,691 B2
(45) Date of Patent: May 23, 2017

(54) METHOD FOR PERFORMING AN AT LEAST SEMI-AUTONOMOUS PARKING PROCESS OF A MOTOR VEHICLE IN A GARAGE, PARKING ASSISTANCE SYSTEM AND MOTOR VEHICLE

(71) Applicant: VALEO Schalter und Sensoren GmbH, Bietigheim-Bissingen (DE)

(72) Inventors: Markus Heimberger, Besigheim (DE); Vsevolod Vovkushevsky, Bietigheim-Bissingen (DE); Oliver Grimm, Flein (DE)

(73) Assignee: VALEO Schalter und Sensoren GmbH, Bietigheim-Bissingen (DE)

( * ) Notice: Subject to any disclaimer, the term of this patent is extended or adjusted under 35 U.S.C. 154(b) by 75 days.

(21) Appl. No.: 14/442,509

(22) PCT Filed: Nov. 12, 2013

(86) PCT No.: PCT/EP2013/073604
§ 371 (c)(1),
(2) Date: May 13, 2015

(87) PCT Pub. No.: WO2014/076071
PCT Pub. Date: May 22, 2014

(65) Prior Publication Data
US 2016/0288833 A1  Oct. 6, 2016

(30) Foreign Application Priority Data
Nov. 14, 2012 (DE) .................. 10 2012 022 336

(51) Int. Cl.
*B60T 17/22* (2006.01)
*B62D 15/02* (2006.01)
(Continued)

(52) U.S. Cl.
CPC ........... *B62D 15/0285* (2013.01); *B60R 1/00* (2013.01); *B62D 15/027* (2013.01);
(Continued)

(58) Field of Classification Search
USPC ......... 604/130; 382/104, 105; 340/435, 903; 701/41, 42, 28, 36, 408, 11, 23, 25, 435
See application file for complete search history.

(56) References Cited

U.S. PATENT DOCUMENTS 7,431,117 B2 * 10/2008 Ito ..................... B62D 15/0235
180/204
8,306,747 B1 * 11/2012 Gagarin ................... G01C 7/04
701/408
(Continued)

FOREIGN PATENT DOCUMENTS

DE         103 23 915 A1    2/2005
DE    10 2004 028 763 A1    1/2006
(Continued)

OTHER PUBLICATIONS

International Search Report issued in PCT/EP2013/073604 mailed on Feb. 17, 2014 (6 pages).
(Continued)

*Primary Examiner* — Thomas Tarcza
*Assistant Examiner* — Richard Goldman
(74) *Attorney, Agent, or Firm* — Osha Liang LLP

(57) ABSTRACT

The invention relates to a method for performing an at least semi-autonomous parking process of a motor vehicle (1) in a garage (16), wherein the garage (16) is detected and a current position of the motor vehicle (1) relative to the garage (16) is determined by means of a parking assistance system (2) of the motor vehicle (1), and wherein following detection of the garage (16) the at least semi-autonomous parking process is carried out depending on the current
(Continued)

position of the motor vehicle (1) relative to the garage (16), wherein an image of the garage (16) is recorded by means of a camera (8, 10, 11, 12) of the parking assistance system (2) and the detection of the garage (16) comprises subjecting the image to pattern recognition regarding the garage entrance (17) by means of an image processor (6) of the parking assistance system (2) and identifying the garage (16) by means of the pattern recognition.

14 Claims, 3 Drawing Sheets

(51) Int. Cl.
| | | |
|---|---|---|
| *G06K 9/00* | (2006.01) | |
| *G08G 1/16* | (2006.01) | |
| *B60R 1/00* | (2006.01) | |
| *G05D 1/00* | (2006.01) | |
| *G06K 9/46* | (2006.01) | |

(52) U.S. Cl.
CPC ....... *G05D 1/0088* (2013.01); *G06K 9/00812* (2013.01); *G06K 9/4604* (2013.01); *G08G 1/168* (2013.01); *B60R 2300/806* (2013.01)

(56) References Cited

U.S. PATENT DOCUMENTS

| | | | | |
|---|---|---|---|---|
| 8,395,529 B2* | 3/2013 | Seder | .................... | G01S 13/723 340/905 |
| 2002/0016657 A1* | 2/2002 | Iwazaki | ................... | B62D 1/28 701/41 |
| 2003/0093210 A1* | 5/2003 | Kondo | ............... | B60G 17/0195 701/96 |
| 2005/0049767 A1* | 3/2005 | Endo | ................. | B62D 15/0285 701/36 |
| 2005/0165517 A1* | 7/2005 | Reich | ..................... | A63H 27/04 701/11 |
| 2006/0089770 A1* | 4/2006 | Ito | .......................... | B62D 1/286 701/41 |
| 2008/0091320 A1* | 4/2008 | Sakai | ................. | B62D 15/0285 701/42 |
| 2008/0154464 A1* | 6/2008 | Sasajima | ............ | B62D 15/0285 701/42 |
| 2010/0098290 A1* | 4/2010 | Zhang | .................. | B60W 30/00 382/100 |
| 2010/0245127 A1* | 9/2010 | Hong | ..................... | B60Q 9/006 340/932.2 |
| 2012/0022716 A1* | 1/2012 | Kitahama | .............. | G01C 21/34 701/1 |
| 2013/0085637 A1* | 4/2013 | Grimm | ................. | B60W 30/06 701/25 |
| 2014/0025229 A1* | 1/2014 | Levien | .................... | A61M 5/20 701/2 |
| 2014/0121883 A1* | 5/2014 | Shen | .................. | B62D 15/0285 701/28 |
| 2014/0180523 A1* | 6/2014 | Reichel | .............. | B62D 15/0285 701/23 |
| 2015/0241241 A1* | 8/2015 | Cudak | .................. | B62D 15/027 701/408 |
| 2016/0167702 A1* | 6/2016 | Morimoto | ............ | B62D 5/0469 701/41 |

FOREIGN PATENT DOCUMENTS

| | | | |
|---|---|---|---|
| DE | 10 2005 008 874 A1 | 9/2006 | |
| DE | 10 2008 002 598 A1 | 1/2009 | |
| DE | 102010056064 A1 * | 12/2010 | ............. G08G 1/168 |
| DE | 10 2009 057837 A1 | 6/2011 | |
| DE | 10 2010 047 161 A1 | 4/2012 | |
| DE | 10 2010 056064 A1 | 6/2012 | |
| EP | 1 249 379 A2 | 10/2002 | |
| WO | 2011/154242 A1 | 12/2011 | |

OTHER PUBLICATIONS

German Search Report issued in 10 2012 022 336.6 mailed on Jun. 12, 2013 (5 pages).

* cited by examiner

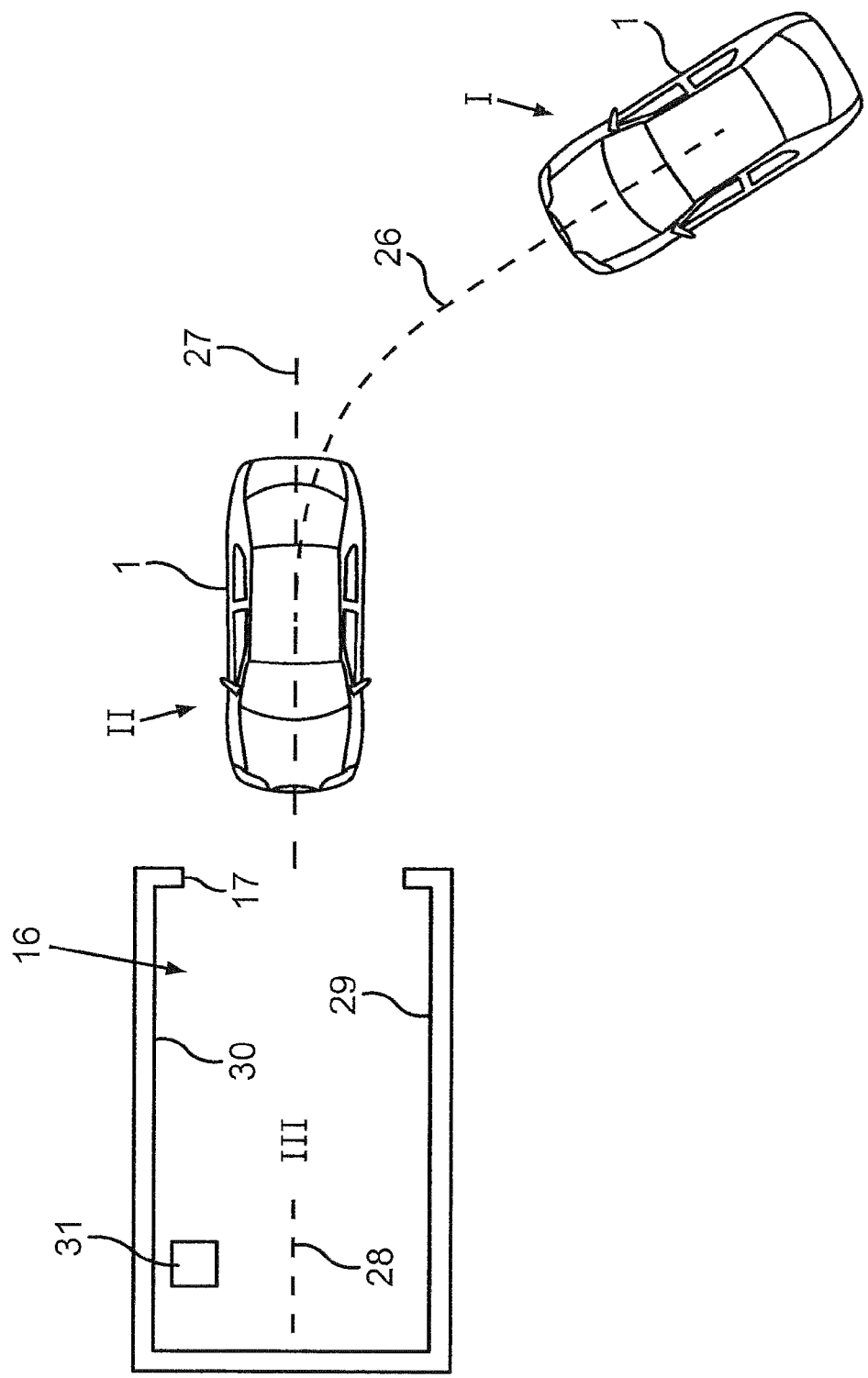

METHOD FOR PERFORMING AN AT LEAST SEMI-AUTONOMOUS PARKING PROCESS OF A MOTOR VEHICLE IN A GARAGE, PARKING ASSISTANCE SYSTEM AND MOTOR VEHICLE

The invention relates to a method for performing an at least semi-autonomous parking process of a motor vehicle in a garage, wherein by means of a parking assistance system of the motor vehicle the garage is detected and a current position of the motor vehicle relative to the garage is determined, and wherein following detection of the garage the at least semi-autonomous parking process is carried out depending on the current position of the motor vehicle relative to the garage. Moreover, the invention relates to a parking assistance system for performing such a method as well as a motor vehicle with such a driver assistance system.

Parking assistance systems for motor vehicles are already prior art. They are used to support the driver when parking his motor vehicle in a parking space and possibly also when exiting from the parking space. Semi-automatic parking assistance systems are known for this on the one hand as well as fully automatic parking assistance systems on the other hand. With semi-autonomous parking assistance systems the system only undertakes lateral guidance and hence the steering of the motor vehicle, whereas the driver himself has to operate the accelerator pedal and brake. Fully automatic parking assistance systems in turn automatically control both the lateral guidance as well as the longitudinal guidance of the motor vehicle, wherein the driver only needs to enable the automatic parking process and can also interrupt the same at any time. Semi-autonomous systems are also known with which steering instructions are only output to the driver and the driver has to carry out both longitudinal guidance and also lateral guidance himself. All types of system have in common that the parking assistance system can detect the parking space using recorded environment information and can determine the current position of the motor vehicle relative to the parking space. Depending on the current position of the motor vehicle, the system then calculates a suitable parking path for the parking process, along which the motor vehicle will be fully automatically or semi-autonomously guided into the target position in the parking space without collisions.

Current interest is directed to an at least semi-autonomous parking assistance system, by means of which the motor vehicle can be parked in a garage semi-autonomously or fully automatically. Such systems are also already part of the prior art. Thus for example document EP 1 249 379 A1 already describes a parking assistance system with which when parking the driver can stop his motor vehicle in front of a selected garage entrance for example and can leave the stopped vehicle before the start of the parking process. The driver of the vehicle then activates the parking assistance system that is within the vehicle with a transmitter, the parking assistance system then fully automatically controls the vehicle into the intended target position and parks it there safely by means of the corresponding drive and steering control elements using measured position and environment data and control commands derived therefrom.

A method for operating image-based navigation in vehicles is known from DE 10 2005 008 874 A1, wherein environment information is recorded and displayed on a visual display. Using the displayed environment information, a target position can then be approached. The representation of a warehouse can be shown on the display for example for selection as the object to be approached. The driver then selects the warehouse as the object to be approached by touching the same on the visual display with a suitable input means. The object will then be shown visually highlighted as the target object. The driver can then select a target region on the display with the input means, namely for example using target points or by means of a flat input means. Following the input, lines that specify the door of the warehouses as the target region are then automatically determined by means of an image processing algorithm using the target points. The driver consequently has to determine for himself where the door of the warehouse is located. The system is not able to detect the door automatically.

With parking assistance systems that are designed for semi-autonomous or fully automatic parking in a garage, there is a particular challenge in detecting the garage automatically by the parking assistance system. The parking assistance system should be capable of detecting the garage as the target position of the vehicle without the driver having to perform a special input for this. The parking assistance system should thus be able to detect a parking scenario in which the driver stops his motor vehicle in front of the garage or in the surroundings of the garage.

It is the object of the invention to show a solution for being able to reliably detect the garage automatically by means of the parking assistance system using a method of the above-mentioned type.

This object is achieved according to the invention by a method, by a parking assistance system as well as by a motor vehicle with the features according to the respective independent claims. Advantageous embodiments of the invention are the subject matter of the dependent claims, the description and the figures.

A method according to the invention is used for performing an at least semi-autonomous parking process of a motor vehicle in a garage. By means of the parking assistance system of the motor vehicle, the garage is detected and a current position of the motor vehicle relative to the garage is determined using environment information. Following detection of the garage, the at least semi-autonomous parking process is carried out depending on the current position of the motor vehicle relative to the garage. In doing so, a parking path for example can be calculated depending on the current position. According to the invention, it is provided that an image of the garage is recorded by means of a camera of the parking assistance system and the detection of the garage includes subjecting the image to pattern recognition with regard to a garage entrance by means of an image processor of the parking assistance system and the parking assistance system automatically identifying the garage using the pattern recognition.

Thus for detection of the garage, at least one image of the environment is recorded by means of a camera of the motor vehicle and the image is analysed with regard to a quite special pattern, namely with regard to a garage entrance. The detection of the garage is thus carried out by identifying the garage entrance in the image. The invention makes use of the fact here that a garage entrance is typically limited both laterally to the left and to the right and thus also above, and said limits, which are disposed relative to each other in a quite specific manner, can be identified in the camera image without much cost using pattern recognition, because the limits have a relatively high contrast, in particular to the opening of the garage entrance itself, and indeed even if the entrance is closed by a garage door. The scene or the garage entrance can thus be described and detected by two vertical lines and one horizontal line overlaying the vertical lines or located very close to the vertical lines. With the method according to the invention, it is achieved that the garage can be detected automatically or automatically with the parking assistance system without the driver having to specify a corresponding target position himself. Following detection of the garage by the parking assistance system, the driver can now enable the at least semi-autonomous parking process, and the motor vehicle will be parked in the garage at least semi-automatically. The driver can either get out of the vehicle for this and enable the parking process by means of a remote controller, or he can remain in the motor vehicle and possibly enable the parking process using operating devices that are attached to the vehicle. Following detection of the garage, information can optionally also be output to the effect that the garage has been detected and the driver now has the option of enabling the parking process.

The camera can record a region of the environment in front of the motor vehicle for example and can be disposed behind the windscreen for example. In addition or alternatively, a camera can also be used that records the region of the environment behind the motor vehicle. Such a rear view camera can for example be placed on the rear bumper or even on the boot lid or behind the rear screen.

The camera is preferably a video camera that provides a number or a sequence of images per second. For example, a CCD camera or a CMOS camera is used. The image processor thus identifies the pattern of the garage entrance in the camera image. As a pattern for this at least two edges, namely in particular at least one vertical and one horizontal edge, directly bounding the garage entrance can be identified in the image. A garage entrance is thus typically delimited near the ground by three edges, namely two vertically extending and thus mutually parallel edges as well as a horizontal edge that connects the two vertical edges to each other in the upper region. For edge recognition, for example, the Sobel filter can be implemented, by means of which the horizontal edge and the vertical edges are identified. This allows the garage entrance to be reliably identified without much computing cost.

If at least one vertical edge and one horizontal edge are detected as a pattern of the garage entrance, then the identification of the garage can include determining a ratio of the respective lengths of the vertical edge on the one hand and the horizontal edge on the other hand in the image. By analysing the ratio it can then be verified whether it is actually a garage entrance in the identified pattern or not. The edges in particular typically have a length ratio that lies within a certain range of values. As a rule the horizontal edge is in particular slightly longer than the vertical edges. Thus errors in the detection of the garage can be avoided.

In addition or alternatively, at least two corners of the garage entrance are detected in the image by means of the image processor as a pattern of the garage entrance. A pattern recognition is thus in particular carried out for the two right angles that are formed by the three lines, namely the two vertical lines and the horizontal line that delimits the garage entrance at the top. The lines can also be described using said two angles. The detection of the corners also ensures reliable and error-free identification of the garage entrance.

Furthermore, in addition or alternatively it can be provided that at least one horizontal edge—namely the upper edge—is detected as a pattern for the garage entrance and is included in the identification of the garage, that a horizon and thus a boundary line between the imaged objects (such as a house comprising the garage) and the sky is searched for in the image. The identification of the horizon above the upper horizontal edge of the garage entrance provides a further plausibility check.

The current position of the motor vehicle relative to the garage is preferably initially determined using the image of the camera. The determination of the current position of the motor vehicle relative to the garage can include that a current orientation or an orientation angle of the motor vehicle relative to the garage is determined using the image of the garage entrance. In doing so the orientation of the motor vehicle is determined in particular using an orientation of at least one of the edges, in particular the horizontal edge, in the image and/or using the angle of at least one of the identified corners. Using the camera image, the precise orientation of the motor vehicle in relation to the garage and hence an angle between the longitudinal axis of the vehicle and the longitudinal axis of the garage can be determined with relatively high precision. The at least semi-autonomous parking process can then be performed depending on said orientation of the motor vehicle, and in particular a parking path along which the motor vehicle is guided can be calculated.

The determination of the current position of the motor vehicle can also include determining a current position of the vehicle relative to the garage and/or a distance of the motor vehicle from the garage using the image of the garage entrance. Said actual distance can be calculated using the distance of the garage entrance from the lower image edge in the image and/or depending on the length of the edges in the image. The relative position can in turn be determined using the position of the garage entrance in the image. In this way at least a partial parking path can then be determined, along which the motor vehicle is guided towards the garage in order to also then be able to recognize the garage by means of at least one further sensor, such as for example using an ultrasonic sensor and/or a radar sensor and/or a lidar sensor.

It has proved to be advantageous if the garage entrance is recorded by means of at least one sensor of the parking assistance system that is different from the camera, in particular at least one distance sensor, and the identification of the garage can be checked or plausibility checked using sensor data of the at least one sensor. Two different scenarios are possible here: on the one hand the garage can initially only be identified using the image of the camera if the garage is outside the detection region of the sensor. Here the sensor can only detect the garage when the motor vehicle approaches the garage. In this scenario the parking process will thus be partially carried out using only the image, and following detection of the garage by the sensor a check will again be made using the sensor data as to whether it is a garage or not. Further guidance of the vehicle can then be carried out at least using sensor data of the sensor. On the other hand, a scenario can also occur in which the garage is already in the detection region of the sensor in the initial position of the vehicle. A plausibility check can already be carried out here in the actual initial position of the vehicle using sensor data of the sensor. In particular, at least one ultrasonic sensor and/or at least one radar sensor and/or at least one lidar sensor, in particular a laser scanner, can be used as a distance sensor. It is especially possible when using a radar sensor and/or a laser scanner to scan the environment of the vehicle with high accuracy and thus to obtain an image of the environment or even to detect the garage entrance. In the event of a short distance of the vehicle from the garage, the same can also be detected by means of ultrasonic sensors, and the motor vehicle can be guided into the garage under control.

A height of the garage entrance is preferably determined using the image of the garage entrance. The determination of the height of the garage entrance is preferably carried out here depending on the length of at least one of the vertical edges in the image. The determined height of the garage entrance can then be compared with the actual height of the vehicle. This enables the driver to possibly be warned that his motor vehicle is too high for the identified garage. If the height of the vehicle is greater than or equal to the determined garage height, an audible and/or visual warning signal may be output to the driver. The distance to the garage that is measured by means of the at least one sensor can also be taken into account during determination of the height.

In a preferred embodiment, a parking path from the current position of the vehicle at least to an intermediate position between the current position and a target position in the garage is determined using the image of the garage entrance, in particular depending on the determined orientation and/or position of the vehicle relative to the garage and/or depending on the distance of the vehicle from the garage, and hence as a whole depending on the current position of the vehicle relative to the garage, and the vehicle is guided along the parking path fully automatically or semi-autonomously. The guidance of the motor vehicle into the intermediate position is preferably carried out exclusively using the image of the garage entrance or even additionally using the sensor data of at least one sensor. Said embodiment has in particular proved itself to be advantageous if the garage is outside the detection region of the at least one sensor in the initial position of the vehicle. The vehicle can then be guided into the intermediate position exclusively using the image of the garage entrance, wherein in the intermediate position the garage can already be determined by the at least one sensor. By guiding the vehicle into the intermediate position, it is thus achieved that the motor vehicle can also be fully parked in the garage without collisions if the garage is outside the detection region of the sensor in the original starting position of the vehicle. The vehicle is in fact guided into such an intermediate position in which it is preferably ensured that further sensors can detect the garage and the vehicle can safely be guided into the target position in the garage. However, if the vehicle is stopped at a short distance from the garage, the determination of the intermediate position may be able to be dispensed with.

The parking path is preferably determined using the image of the garage entrance such that in the intermediate position a central longitudinal axis of the vehicle passes through the garage entrance, in particular being oriented parallel to a central longitudinal axis of the garage, more preferably coinciding with the central longitudinal axis of the garage. In the intermediate position the motor vehicle is thus oriented such that the further guidance to the target position in the garage can be carried out without much effort. The vehicle can for example be guided from the intermediate position into the target position using distance sensors that detect the lateral distances to the walls of the garage as well as the distances to obstructions that are located in front of the motor vehicle—for example in the garage.

If the motor vehicle is guided along the parking path, then when the motor vehicle approaches the garage said garage can be detected by means of at least one sensor of the parking assistance system, in particular by a distance sensor. The parking path can then be completed up to the target position using sensor data of said sensor, or an already complete parking path that was determined using the image can be corrected. Said embodiment is based on being able to determine the distance to obstructions, such as for example to the walls the garage, with greater accuracy by means of distance sensors than using the camera image. If the garage is already in the detection region of the at least one sensor, then the originally determined parking path can be corrected or the incompletely determined parking path can even be completed.

It can also be provided that following detection of the garage by the at least one sensor, the parking path can be continually corrected using respective current sensor data of the at least one sensor. Here regulation of the lateral distances to the walls of the garage is preferably carried out depending on the current measured distances. It may for example be such that the motor vehicle is guided centrally between the two garage walls using current sensor data. However, if other obstructions are detected within the garage itself, these will be avoided without collisions.

Moreover, the invention relates to a parking assistance system that is designed for performing the method according to the invention.

A motor vehicle according to the invention comprises a parking assistance system according to the invention.

The preferred embodiments presented with reference to the method according to the invention and their advantages apply correspondingly to the parking assistance system according to the invention as well as to the motor vehicle according to the invention.

Further features of the invention are revealed in the claims, the figures and the description of the figures. All features and combinations of features previously mentioned in the description as well as the features and combinations of features mentioned below in the description of the figures and/or shown in the figures alone are not only able to be used in the respective stated combination, but also in other combinations or even on their own.

The invention will now be explained in detail using a preferred exemplary embodiment, as well as with reference to the accompanying figures.

In the figures:

FIG. 3 shows in a schematic representation a top view of a parking scenario, wherein a method according to an embodiment of the invention is explained in detail.

Figure 1:
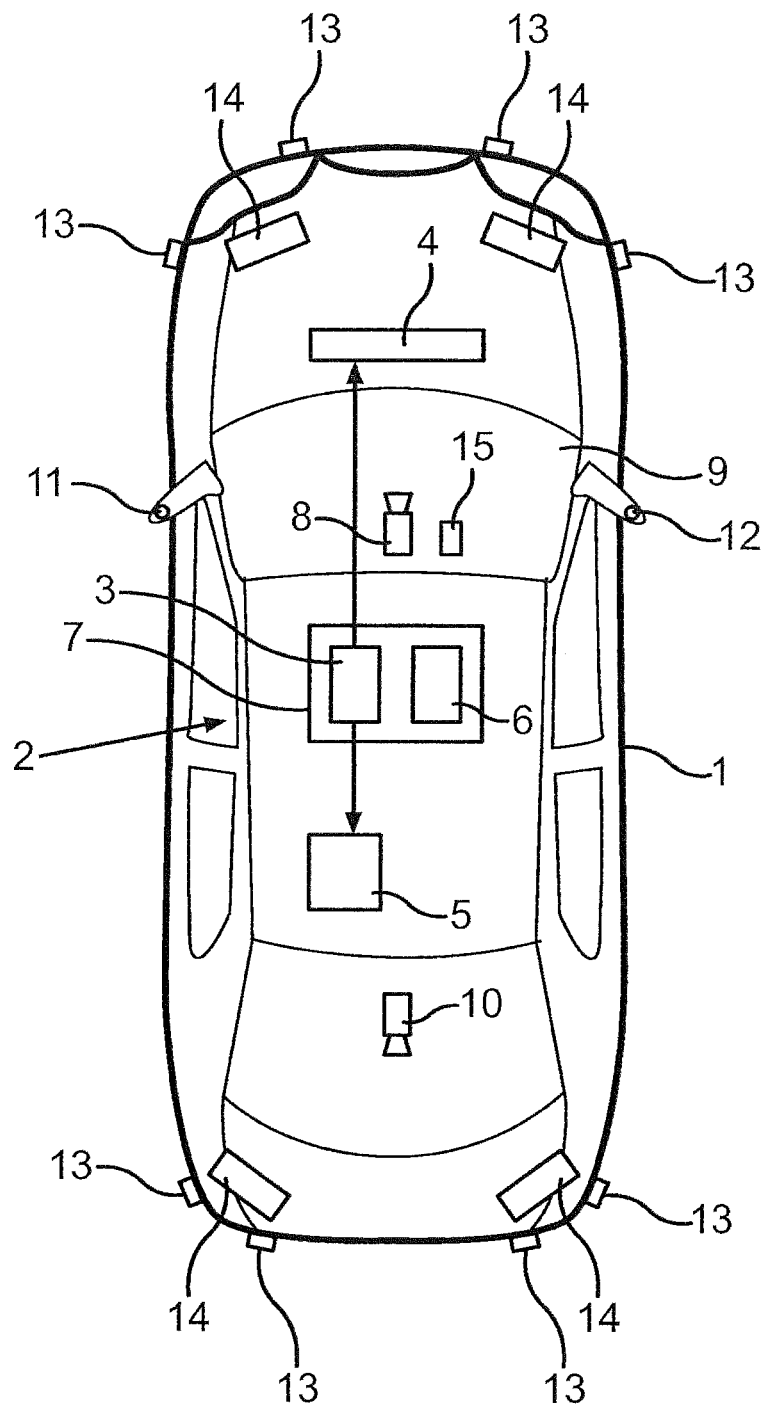
FIG. 1 shows in a schematic representation a motor vehicle with a parking assistance system according to an embodiment of the invention.

A motor vehicle 1 shown in FIG. 1 is a passenger car for example. The motor vehicle 1 comprises a parking assistance system 2 that is a semi-autonomous or fully automatic parking assistance system. The parking assistance system 2 comprises a control device 3 or a controller. The control device 3 controls a steering device 4 and optionally also a drive and braking device 5 of the motor vehicle 1. The control device 3 can automatically operate the steering device 4 and optionally also the drive and braking device 5 in order to automatically control the lateral guidance and possibly the longitudinal guidance of the motor vehicle 1.

Moreover, the parking assistance system 2 comprises an image processor 6 that is designed to process images as well as possibly to process and analyse sensor data. The control device 3 and the image processor 6 may be integrated within a common computing device 7 (for example a signal processor or similar).

The parking assistance system 2 comprises a detection device that comprises at least one camera on the one hand and optionally at least one distance sensor on the other hand. In the exemplary embodiment, a first camera 8 is placed behind the windscreen 9 of the motor vehicle 1 and records a region of the environment in front of the motor vehicle 1. A second camera 10 is disposed in the rear region of the motor vehicle 1, e.g. behind the rear screen or even on the boot lid, and records the region of the environment behind the motor vehicle 1. Cameras 11, 12 can also be optionally integrated within the respective external mirrors of the motor vehicle 1. All cameras 8, 10, 11, 12 provide images of the respective region of the environment and transmit the recorded images to the image processor 6.

The detection device optionally also comprises the following distance sensors: ultrasonic sensors 13, which are both distributively disposed on the front and also on the rear bumper of the motor vehicle 1; radar sensors 14, which are disposed in the respective corner regions for example; as well as a laser scanner 15, which is disposed behind the windscreen 9 for example. Said distance sensors are also coupled to the computing device 7, namely in particular the image processor 6, so that the computing device 7 can process the sensor data of said sensors.

The parking assistance system 2 is designed to perform an at least semi-autonomous process of parking the motor vehicle 1 in a garage. The image processor 6 can detect the garage using images of one of the cameras 8, 10, 11, 12. Depending on whether the vehicle 1 is stopped with its front or with its rear facing the garage, the garage can either be detected using an image of the camera 8 or even using an image of the camera 10 and possibly also using images of the cameras 11, 12. An exemplary camera image is shown in FIG. 2.

Figure 2:
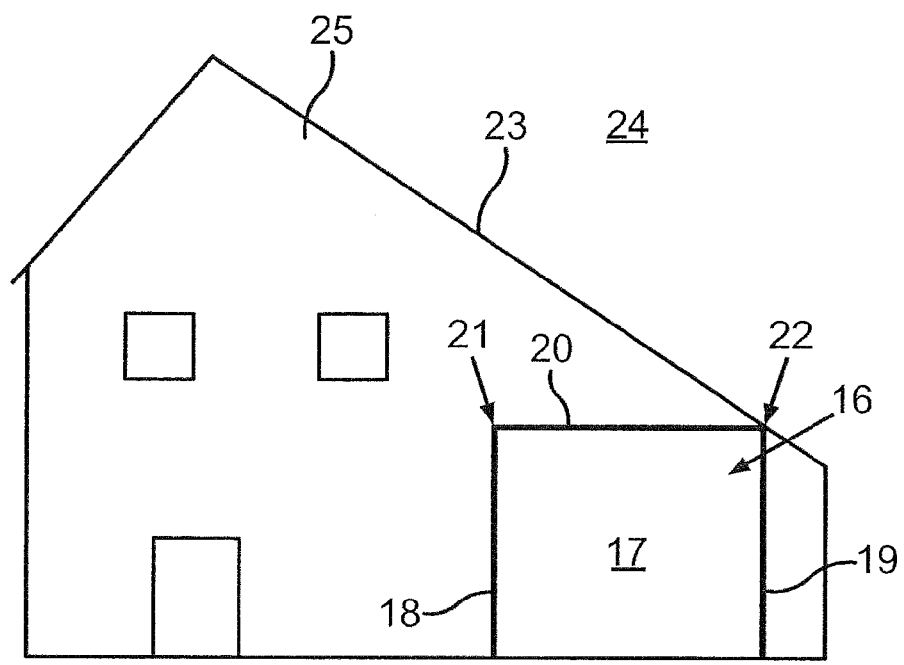
FIG. 2 shows in schematic representation an exemplary camera image.

As is apparent from FIG. 2, a garage 16 or its garage entrance 17 is directly delimited by three edges, namely by two vertical edges 18, 19 as well as by a horizontal edge 20. Whereas the vertical edges 18, 19 delimit the garage entrance 17 laterally to the left and to the right, the garage entrance 17 is delimited at the top by the horizontal edge 20. The image processor 6 analyses the images with regard to a specified pattern, and indeed in relation to the garage entrance 17. The following embodiments can be provided for this:

the image processor 6 identifies the edges 18, 19, 20 in the image and the specific arrangement of the edges relative to each other and thereby the garage entrance 17 and/or the image processor 6 identifies corners 21, 22, namely the upper corners, of the garage entrance 17 and thus identifies the garage 16 and/or the image processor 6 identifies a horizon 23 above the horizontal edge 20, i.e. a boundary line between the sky 24 and the imaged house 25.

The garage entrance 17 is thus identified by means of pattern recognition by the image processor 6. The garage entrance 17 is identified using characteristic patterns of two vertical edges 18, 19 and one horizontal edge 20 or of two vertical lines and one horizontal line. All edge lines can first be extracted from the image, and the characteristic pattern of the garage entrance 17 can then be recognised in the extracted edge lines.

If the garage entrance 17 has been detected, then the computing device 7—for example the image processor 6—determines the current position of the motor vehicle 1 relative to the garage entrance 17. This initially comprises the determination of the current orientation of the vehicle 1 in relation to the garage 16. The orientation is understood here as an orientation angle and thus an angle between the longitudinal axis of the vehicle and the longitudinal axis of the garage 16. Said angle can be determined using the alignment or orientation of the horizontal edge 20 in the image and/or using the angle of the respective corner 21, 22. The determination of the relative position can furthermore also include the determination of the distance of the vehicle 1 from the garage 16. Said distance can be determined using the distance of the garage 16 from the lower image edge in the image. Furthermore, it is also possible to determine the precise position of the vehicle 1 in relation to the garage 16 using the image of the garage entrance 17, since the position of the garage entrance 17 in the camera image depends on the actual relative position of the vehicle 1 in relation to the garage 16.

A parking scenario is now shown in FIG. 3, in which the motor vehicle 1 is stopped in an initial position I. The driver can now exit from the vehicle 1 or remain in the interior of the vehicle 1. The driver may also be able to perform an input on a remote controller or even by means of an operating device attached to the vehicle, by means of which the search for a garage 16 by the parking assistance system 2 is started. For example, a knob can be pressed for this. Diverse embodiments are provided here: on the one hand said input of the driver can relate directly to the search for a garage 16. On the other hand, said input can also relate to the search for an optional parking area—in this case both a garage 16 and also a conventional parking space will be searched for. The search for a garage 16 may also be automatically initiated by the parking assistance system 2 without the driver having made an input. In this case, for example, the garage 16 will then be searched for when the vehicle 1 is stopped.

In the initial position I the image processor 6 analyses the images with respect to the garage entrance 17 and identifies the pattern of the garage entrance 17 in the images. The garage 16 is thus identified by the image processor 6 detecting the specific pattern of the three edges 18, 19, 20 in the specific arrangement relative to one another. This can be plausibility checked by the detection of the horizon 23 and/or by calculating a ratio of the length of the horizontal edge 20 to the vertical edge 18 or 19.

In the case of an already identified garage entrance 17, the computing device 7 calculates a parking path 26 from the current initial position I to an intermediate position II between the initial position I and a target position III in the garage. Said parking path 26 up to the intermediate position II can exclusively be determined using the images. If the garage 16 is already in the detection region of the sensors 13, 14, 15, then the sensor data of said sensor may also be taken into account during the determination of the parking path 26. In this case the parking path 26 may also be fully specified as far as the target position III.

The motor vehicle 1 is then semi-autonomously or fully automatically guided along the determined parking path 26 into the intermediate position II. The control device 3 controls at least the steering device 4 and optionally also the drive and braking device 5 during this.

The parking path 26 is determined such that in the intermediate position II—if possible based on the current position of the vehicle I—the central longitudinal axis 27 of the motor vehicle 1 coincides with a central longitudinal axis 28 of the garage 16. If such positioning of the vehicle 1 is not possible, the central longitudinal axis 27 can extend parallel to the central longitudinal axis 28 or even at least through the garage entrance 17.

When the vehicle 1 approaches the garage entrance 17—for example in the intermediate position II—the garage entrance and then also the walls 29, 30 of the garage 16 pass into the detection region of the sensors 13, 14, 15. The sensors now detect the distances to the garage 16, and in particular to the boundaries or edges 18, 19 of the garage entrance 17. Depending on said sensor data, the parking path 26 can now be completed as far as the target position III or an already original completely determined parking path 26 can even be corrected. The motor vehicle 1 can also be guided into the garage 16 from the intermediate position II in a controlled manner such that the distances from the vehicle 1 to the walls 39, 30 remain the same. Central positioning of the vehicle 1 in the garage 16 is thus enabled. The parking path 26 can now also be continuously corrected depending on the respective current sensor data, in order to possibly be able to avoid obstructions 31 located within the garage 16. In the scenario displayed in FIG. 3, the obstruction 31 is detected and the motor vehicle 1 is not parked directly in the centre between the walls 29, 30, but is parked on the left next to the obstruction 31 without collisions.

The height of the garage entrance 17 can also be optionally determined using the images by using a length of the edges 18, 19 in the image. Said height can then be compared with the height of the vehicle 1 and a warning signal may also be output, by means of which the driver is made aware that no parking process is possible because the height of the garage entrance 17 is too low.

The driver can also interrupt the parking process at any time. This is carried out for example by means of a remote controller or even—if the driver is in the vehicle 1—by means of a control device attached to the vehicle.

The invention claimed is:

1. A method for performing an at least semi-autonomous parking process of a motor vehicle in a garage, comprising:
    detecting the garage and determining a current position of the motor vehicle relative to the garage using a parking assistance system of the motor vehicle;
    following detection of the garage, carrying out the at least semi-autonomous parking process depending on the current position of the motor vehicle relative to the garage;
    recording an image of the garage by a camera of the parking assistance system,
    wherein the detection of the garage comprises the image being subjected to pattern recognition with respect to a garage entrance by an image processor of the parking assistance system, wherein the garage is identified by means of the pattern recognition, and
    wherein the determination of the current position of the motor vehicle relative to the garage comprises determining a current orientation of the motor vehicle relative to the garage using the image of the garage entrance, in particular using an orientation of at least one of the edges in the image and/or using the angle of at least one of the corners, wherein the corners are the intersections between vertical edges and the horizontal edge.

2. The method according to claim 1, wherein at least two edges delimiting the garage entrance, the at least two edges comprising at least one vertical edge and a horizontal edge, are detected in the image as the pattern of the garage entrance by the image processor.

3. The method according to claim 2, wherein at least one vertical edge and one horizontal edge are detected as the pattern of the garage entrance and the identification of the garage comprises determining a ratio of the respective lengths of the vertical edge and of the horizontal edge in the image.

4. The method according to claim 1, wherein at least two corners of the garage entrance are detected in the image as the pattern of the garage entrance by the image processor.

5. The method according to claim 1, wherein at least one horizontal edge is detected as the pattern of the garage entrance and the identification of the garage comprises identifying a horizon above the horizontal edge in the image.

6. The method according to claim 1, wherein determination of the current position of the motor vehicle relative to the garage comprises determining a distance of the motor vehicle from the garage and a current position of the motor vehicle relative to the garage using the image of the garage entrance.

7. The method according to claim 1, wherein the garage entrance is recorded by at least one distance sensor of the parking assistance system that is different from the camera, and the identification of the garage is plausibility checked using sensor data of the at least one distance sensor.

8. The method according to claim 1, wherein a height of the garage entrance is determined using the length of at least one of the vertical edges in the image, and is compared with a height of the motor vehicle.

9. The method according to claim 1, wherein a parking path from a current position of the motor vehicle at least to an intermediate position between the current position and a target position in the garage is determined using the image of the garage entrance, depending on the current orientation of the motor vehicle relative to the garage that is determined using the image or depending on a distance of the motor vehicle from the garage entrance that is determined using the image or depending on the current position of the motor vehicle relative to the garage that is determined using the image, and the motor vehicle is guided along the parking path.

10. The method according to claim 9, wherein the parking path is determined such that in the intermediate position a central longitudinal axis of the motor vehicle extends through the garage entrance, the central longitudinal axis of the motor vehicle being coincident with the central longitudinal axis of the garage.

11. The method according to claim 9, wherein when the motor vehicle approaches the garage after reaching the intermediate position, the garage is recorded by at least one distance sensor of the parking assistance system that is different from the camera, and the parking path is completed as far as the target position or an already complete parking path that is determined using the image is corrected using sensor data of the at least one distance sensor.

12. The method according to claim 11, wherein following detection of the garage by the at least one sensor, the parking path is continuously corrected using respective current sensor data of the at least one sensor, wherein the at least one sensor is an ultrasonic sensor, a radar sensor and/or a laser scanner.

13. A parking assistance system for performing an at least semi-autonomous parking process of a motor vehicle in a garage, comprising:
    a detection device for detection of the garage and for determining a current position of the motor vehicle relative to the garage; and
    a control device that is configured to carry out the at least semi-autonomous parking process depending on the current position of the motor vehicle relative to the garage following detection of the garage, wherein the detection device comprises a camera for recording the image of the garage and an image processor that is configured to subject the image to pattern recognition with regard to a garage entrance and to identify the garage by the pattern recognition, and wherein determining the current position of the motor vehicle relative to the garage comprises determining a current orientation of the motor vehicle relative to the garage using the image of the garage entrance, in particular using an orientation of at least one of the edges in the image and/or using the angle of at least one of the corners, wherein the corners are the intersections between vertical edges and the horizontal edge.

14. A motor vehicle with a parking assistance system according to claim 13.

* * * * *